United States Patent
Beck et al.

(10) Patent No.: US 7,953,698 B2
(45) Date of Patent: May 31, 2011

(54) REPLICATION SYSTEM WITH METHODOLOGY FOR REPLICATING STORED PROCEDURE CALLS

(75) Inventors: Wanda Beck, Boulder, CO (US); Derek G. Reiger, Erie, CO (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 11/309,387

(22) Filed: Aug. 3, 2006

(65) Prior Publication Data

US 2008/0034014 A1     Feb. 7, 2008

(51) Int. Cl.
*G06F 7/00* (2006.01)
*G06F 17/00* (2006.01)

(52) U.S. Cl. ........................................ 707/610; 707/667

(58) Field of Classification Search .................. 707/200, 707/610, 667
See application file for complete search history.

(56) References Cited

U.S. PATENT DOCUMENTS

| | | |
|---|---|---|
| 4,819,156 A | 4/1989 | DeLorme et al. |
| 4,945,474 A | 7/1990 | Elliott et al. |
| 5,043,866 A | 8/1991 | Myre et al. |
| 5,155,678 A | 10/1992 | Fukumoto et al. |
| 5,170,480 A | 12/1992 | Mohan et al. |
| 5,280,611 A | 1/1994 | Mohan et al. |
| 5,287,501 A | 2/1994 | Lomet |
| 5,369,757 A | 11/1994 | Spiro et al. |
| 5,455,946 A | 10/1995 | Mohan et al. |
| 5,640,561 A | 6/1997 | Satoh et al. |
| 5,721,918 A | 2/1998 | Nilsson et al. |
| 5,758,150 A * | 5/1998 | Bell et al. .......................... 707/10 |
| 5,778,388 A | 7/1998 | Kawamura et al. |
| 5,806,075 A * | 9/1998 | Jain et al. ....................... 707/201 |
| 6,014,674 A | 1/2000 | McCargar |
| 6,192,398 B1 * | 2/2001 | Hunt .............................. 709/213 |
| 6,275,832 B1 | 8/2001 | Watts et al. |
| 6,321,234 B1 | 11/2001 | Debrunner |
| 6,496,944 B1 | 12/2002 | Hsiao et al. |
| 6,567,928 B1 | 5/2003 | Lyle et al. |
| 6,721,765 B2 | 4/2004 | Ghosh et al. |
| 6,845,392 B2 * | 1/2005 | Koontz et al. .................. 709/219 |
| 6,941,139 B1 * | 9/2005 | Shupe et al. .................. 455/432.3 |
| 2006/0190498 A1 * | 8/2006 | Pruet, III ....................... 707/202 |

OTHER PUBLICATIONS

Information Technology—Database languages—SQL, American National Standard ANSI/ISO/IEC 9075: 1992.

* cited by examiner

*Primary Examiner* — Charles E Lu
(74) *Attorney, Agent, or Firm* — Sterne, Kessler, Goldstein & Fox P.L.L.C.

(57) ABSTRACT

A replication system with methodology for replicating stored procedure calls is described. In one embodiment, for example, in a database system without support for logging stored procedure invocations, a method of the present invention is described for replicating invocation of a stored procedure from a primary database to a replicate database, the method comprises steps of: inserting table data into the primary database for storing information sufficiently characterizing the procedure's invocation to allow its replication, the table data being logged to a log file; reading the log file, for determining changes to apply to the replicate database for replicating the procedure's invocation; and reconstructing the procedure's invocation at the replicate database based on the determined changes.

13 Claims, 6 Drawing Sheets

REPLICATION SYSTEM WITH METHODOLOGY FOR REPLICATING STORED PROCEDURE CALLS

CROSS REFERENCE TO RELATED APPLICATIONS

The present application is related to the following commonly-owned, presently-pending application(s): application Ser. No. 10/605,154, filed Sep. 11, 2003, entitled "Database System Providing Improved Methods For Data Replication". The disclosure of the foregoing application is hereby incorporated by reference in its entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field of the Invention

The present invention relates generally to replication of information in data processing environments and, more particularly, to system and methods for replication of stored procedure calls which occur in database systems (e.g., Oracle) that do not support the logging of stored procedure calls.

2. Description of the Background Art

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information may be retrieved from or updated in such files, and so forth, all without user knowledge of the underlying system implementation. In this manner, the DBMS provides users with a conceptual view of the database that is removed from the hardware level.

DBMS systems have long since moved from a centralized mainframe environment to a de-centralized or distributed environment. Today, one generally finds database systems implemented as one or more PC "client" systems, for instance, connected via a network to one or more server-based database systems (SQL database server). Commercial examples of these "client/server" systems include Powersoft® clients connected to one or more Sybase® Adaptive Servers Enterprise database servers. Both Powersoft® and Sybase® Adaptive Server® Enterprise (formerly Sybase® SQL Server®) are available from Sybase, Inc. of Dublin, Calif. The general construction and operation of database management systems, including "client/server" relational database systems, is well known in the art. See e.g., Date, C., "An Introduction to Database Systems, Volume I and II", Addison Wesley, 1990; the disclosure of which is hereby incorporated by reference.

Each day more and more users base their business operations on mission-critical systems which store information on server-based database systems, such as Sybase® Adaptive Servers Enterprise. As a result, the operations of the business are dependent upon the availability of data stored in their databases. Because of the mission-critical nature of these systems, users of these systems need to protect themselves against loss of the data due to software or hardware problems, disasters such as floods, earthquakes, or electrical power loss, or temporary unavailability of systems resulting from the need to perform system maintenance.

One well-known approach for users to guard against loss of critical business data is to maintain a standby or replicate database. A replicate database is a duplicate or mirror copy of a given database that is maintained either locally at the same site as the primary database or remotely at a different location than the primary database. The availability of a replicate copy of a given database enables a user (e.g., corporation or other business) to reconstruct a copy of a given database in the event of the loss, destruction, or unavailability of the primary database.

Today, a lot of database processing involves the invocation of database stored procedures and functions (hereinafter, collectively referred to as "stored procedures" or "procedures") as part of ongoing transactional database processing (e.g., executing SQL statements). In the area of database replication, stored procedures pose a special set of problems. In particular, some existing database systems in wide use do not record any log information pertaining to the invocation of stored procedures. This creates problems for replication systems. Although it is possible for a replication system to indirectly examine a stored procedure invocation (i.e., by discerning changes to the underlying database tables themselves, as reflected in the log records), replication systems really have no inherent knowledge of database activities other than what they are able to discern from log records. Therefore, for purposes of replication, the absence of log information about stored procedure invocation has to date precluded some widely-used database systems from directly replicating stored procedure invocations.

Nevertheless, performance gains can be realized if direct support for replicating stored procedure invocations is provided. For example, if a stored procedure is invoked that entails substantial modification to the underlying data tables, transmission of that event to a replicate database via (voluminous) log records wastes processing and network resources. Therefore, replicating the effects (i.e., modifications) of stored procedure invocations is at best a suboptimal approach that is expensive, both in terms of bandwidth usage and computing resources. Another reason to provide direct support for the replication of stored procedure invocation is simply customer expectation. As there are existing database systems that do provide log support for stored procedure invocation (including, e.g., present assignee's Sybase Adaptive Server Enterprise), customers have simply come to expect direct support for stored procedure replication in all enterprise-level database systems. Given this customer expectation, there is great interest in providing a replication solution for legacy database systems that do not themselves support this functionality (i.e., do not support the logging of stored procedure invocation).

SUMMARY OF INVENTION

A replication system with methodology for replicating stored procedure calls is described. In one embodiment, for example, in a database system without support for logging stored procedure invocations, a method of the present invention is described for replicating invocation of a stored procedure from a primary database to a replicate database, the method comprises steps of: inserting table data into the primary database for storing information sufficiently characterizing the procedure's invocation to allow its replication, the table data being logged to a log file; reading the log file, for determining changes to apply to the replicate database for replicating the procedure's invocation; and reconstructing the procedure's invocation at the replicate database based on the determined changes.

In another embodiment, for example, a system of the present invention for replicating invocation of a stored procedure is described that comprises: a primary database storing the procedure; a replicate database for receiving replication of the procedure's invocation; at least one special purpose table created in the primary database for storing information sufficiently characterizing the procedure's invocation to allow its replication; a log file storing log records that record changes to the primary database, including changes to the at least one special purpose table; and a log reader supporting replication of the procedure's invocation to the replicate database based on changes recorded in the log file.

DETAILED DESCRIPTION

Glossary

Figure 1:
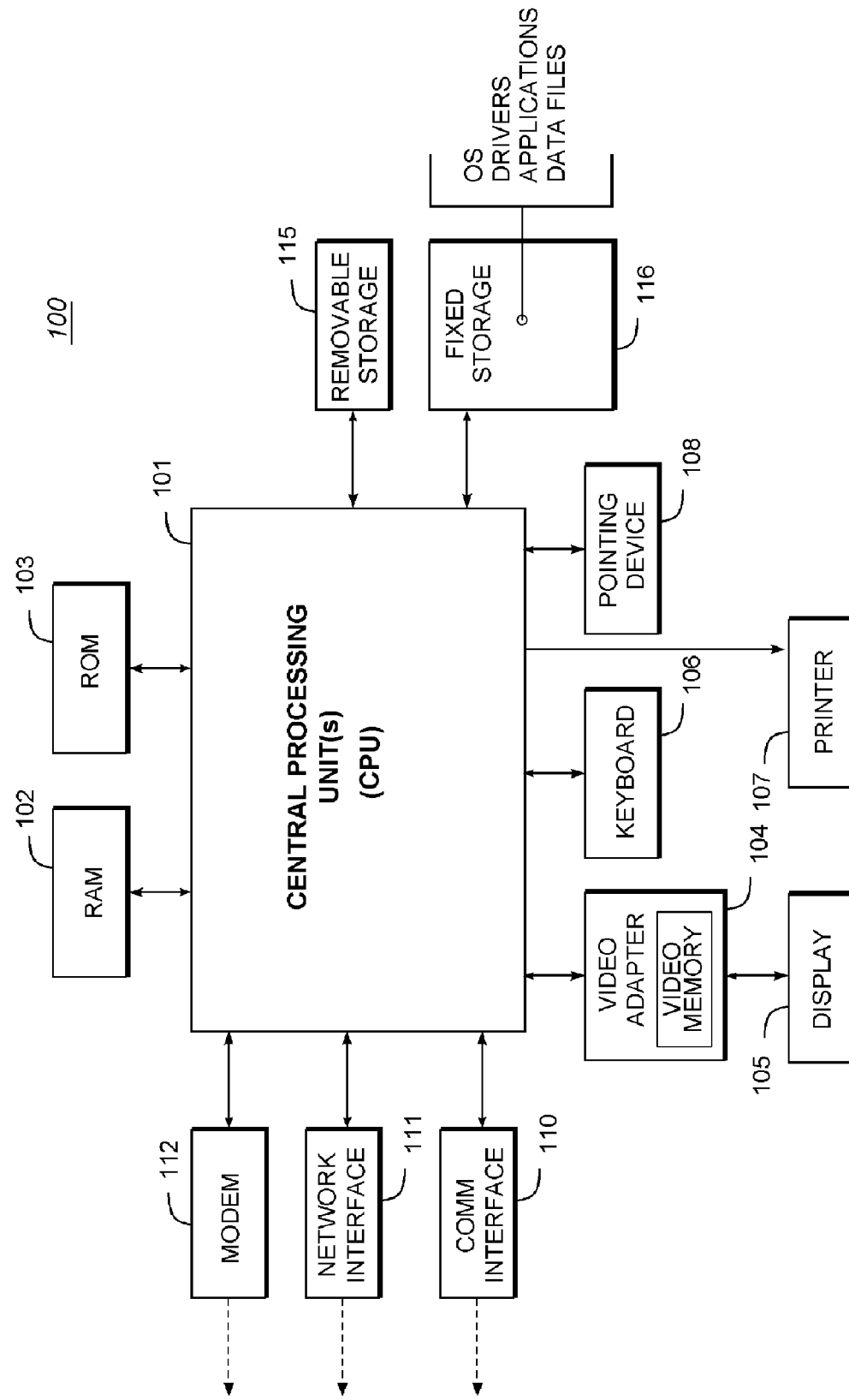
FIG. 1 is a very general block diagram of a computer system (e.g., an IBM-compatible system) in which software-implemented processes of the present invention may be embodied.

The following definitions are offered for purposes of illustration, not limitation, in order to assist with understanding the discussion that follows.

ASE: Sybase Adaptive Server Enterprise.
BLOB: binary large object (see LOB).
BST: blob shadow table, one per marked primary table; holds the primary key values for each operation that involves LOB data; used only in Sybase Replication Agent 12.5.
CLOB: character large object (see LOB).DBMS: database management system.
DDL: Data Definition Language, a set of statements or language enabling the structure and instances of a database to be defined in a human-readable and machine-readable form. SQL, for example, contains DDL commands that can be used either interactively, or within programming language source code, to define databases and their components (e.g., CREATE and ALTER commands).
DML: Data Manipulation Language, a set of statements used to store, retrieve, modify, and erase data from a database (e.g., INSERT INTO command).
DSLR: data source log reader, the Replication Agent component that reads the primary database log.
LOB: large object: data type that holds very large values (up to 2 gigabytes or more, depending on the DBMS). For example: in ASE, text and image; in Oracle, CLOB and BLOB, among others. LTL: Log transfer language, a form of internal communication protocol used between the replication components.
Procedure: Generically refers to a standalone procedure, a standalone function, and/or a procedure or function that is part of an Oracle package.
RA: Replication Agent.
RASD: Replication Agent System Database.
RepAgent: Shorthand for Replication Agent
SQL: Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5)-1999), the disclosure of which is hereby incorporated by reference.
SRP: shadow row procedure, one per marked primary table or marked primary procedure; contains the logic for capturing the operation's primary data and metadata; used only in Sybase Replication Agent 12.5.
ST: shadow table, one per marked primary table or marked primary procedure; holds the primary data values (either column values from a table operation or parameter values from a procedure call).

INTRODUCTION

Referring to the figures, exemplary embodiments of the invention will now be described. The following description will focus on the presently preferred embodiment of the present invention, which is implemented in desktop and/or server software (e.g., driver, application, or the like) operating in a networked environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware and Software (e.g., for Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

A software system is typically provided for controlling the operation of the computer system 100. The software system, which is usually stored in system memory (RAM) 102 and on fixed storage (e.g., hard disk) 116, includes a kernel or operating system (OS) which manages low-level aspects of computer operation, including managing execution of processes, memory allocation, file input and output (I/O), and device I/O. The OS can be provided by a conventional operating system, Microsoft Windows NT, Microsoft Windows 2000, Microsoft Windows XP, or Microsoft Windows Vista (Microsoft Corporation of Redmond, Wash.) or an alternative operating system, such as the previously mentioned operating systems. Typically, the OS operates in conjunction with device drivers (e.g., "Winsock" driver—Windows' implementation of a TCP/IP stack) and the system BIOS microcode (i.e., ROM-based microcode), particularly when interfacing with peripheral devices. One or more application(s), such as client application software or "programs" (i.e., set of processor-executable instructions), may also be provided for execution by the computer system 100. The application(s) or other software intended for use on the computer system may be "loaded" into memory 102 from fixed storage 116 or may be downloaded from an Internet location (e.g., Web server). A graphical user interface (GUI) is generally provided for receiving user commands and data in a graphical (e.g., "point-and-click") fashion. These inputs, in turn, may be acted upon by the computer system in accordance with instructions from OS and/or application(s). The graphical user interface also serves to display the results of operation from the OS and application(s).

The above-described computer hardware and software are presented for purposes of illustrating the basic underlying desktop and server computer components that may be employed for implementing the present invention. For purposes of discussion, the following description will present examples in which it will be assumed that at least one computer serves as a primary database server to perform database operations and that such database operations are replicated to a secondary (or replicate) database server to guard against loss or unavailability of the primary database. The present invention, however, is not limited to any particular environment or device configuration. In particular, a "server" or "client/server" distinction is not necessary to the invention, but is used to provide a framework for discussion. Instead, the present invention may be implemented in any type of system architecture or processing environment capable of supporting the methodologies of the present invention presented in detail below.

Overview of Replicating Stored Procedure Calls

The present invention provides a replication system in which stored procedure calls may be replicated in database systems that otherwise provide no logging of stored procedure information (e.g., such as Oracle database systems). As another aspect of the present invention, the stored procedures calls themselves are replicated, instead of simply replicating the "effects" (i.e., table change data) of the stored procedure calls. By allowing the database user to replicate the procedure call itself in lieu of replicating its effects, the present invention substantially improves replication system performance, especially when the replication system is deployed in a network environment. By focusing on the procedure calls themselves, the present invention can replicate the procedure calls using relatively terse descriptor information. The information may in turn be rapidly transmitted using relatively little network or computing resources. Systems that instead replicate the effects of stored procedure calls, in contrast, must tie up substantial network and computing resources transmitting voluminous log information about potentially large table change data. In enterprise-level production databases, a number of stored procedure calls may in fact require replication. In those environments, the performance improvements afforded by the present invention can be substantial.

In the currently preferred embodiment, the methodology of the present invention is implemented using two phases. In a first phase, during initialization of the replication system (i.e., initialization in preparation for replication, a "proc-active" (procedure active) table and a procedure-call "sequencer" are created so that the system may capture context information (in chronological order, in the currently preferred embodiment) about the procedures that are called. In a second phase, a database user marks a given stored procedure for replication. This is done, for instance, via a user-supplied command (pdb_setrepproc mark), entered using the replication agent (RepAgent) of the present invention. At that point, the system of the present invention proceeds to instrument (i.e., modify) the given stored procedure, in effect placing hooks (code) in the stored procedure that allow the system to monitor the procedure's invocation. In particular, the system records information indicating when the stored procedure begins execution and when it exits, together with information about parameter values (i.e., the parameters or arguments that the procedure is invoked with).

To support replication of a stored procedure's execution, a shadow table corresponding to the stored procedure is created (i.e., as a database table within the existing underlying database system) and includes a column for each of the procedure's parameters. Since the shadow table is a database table, its creation and modifications (e.g., insert, update, and delete operations) are in fact logged by the existing log mechanism of the underlying database system (e.g., Oracle database system). This log information, in turn, may be replicated for processing by the replication system's log reader, just as log information is replicated and processed for other database tables. However, the log reader itself includes additional program logic, constructed in accordance with the present invention, that allows the log reader to recognize the shadow table as a special table for supporting replication of a stored procedure invocation.

A database transaction could be in progress when a stored procedure is called, and continue to be in progress after the stored procedure ends. Therefore, a "proc-active" table is used in conjunction with the shadow table to store additional transaction information, including indicating the transactional context (i.e., active transaction(s)) when the stored procedure was called. In order to determine what to replicate, the replication system's log reader simply refers to the log. Part of what is logged (as a result of administration work for replicating procedure calls) is proc-active log information indicating when a given procedure is executing (i.e., based on what is written to the log about modifications to a corresponding proc-active table). Importantly, the proc-active log information informs the system "what not" to replicate (i.e., what to omit from replication).

Suppose, for example, the database system performs 10 user operations that are table related, followed by invocation of a stored procedure, and then followed by some additional operations after the procedure exits. Before the procedure call, the replication system needs to know that it must replicate those tables that the user has directly affected. During the procedure call, the replication system needs to know that it should not replicate the effects of the procedure call (even though they occur within the same transaction). Finally, after the procedure call ends, the replication system must go back to replicating any (henceforth) affected tables. Using the information stored in the "proc-active" table, the replication system's log reader can discern when execution of the stored procedure starts and ends, so that the log reader can filter out the effects of the stored procedure until the log reader recognizes that the stored procedure has completed execution.

In this manner, the present invention allows the replication of stored procedure calls to replicate databases in database systems that do not log stored procedure calls. The present invention finds particular application in performance-sensitive database systems, especially those where the transfer of procedure effects (i.e., table change data) would degrade performance.

Replication Components

Figure 2:
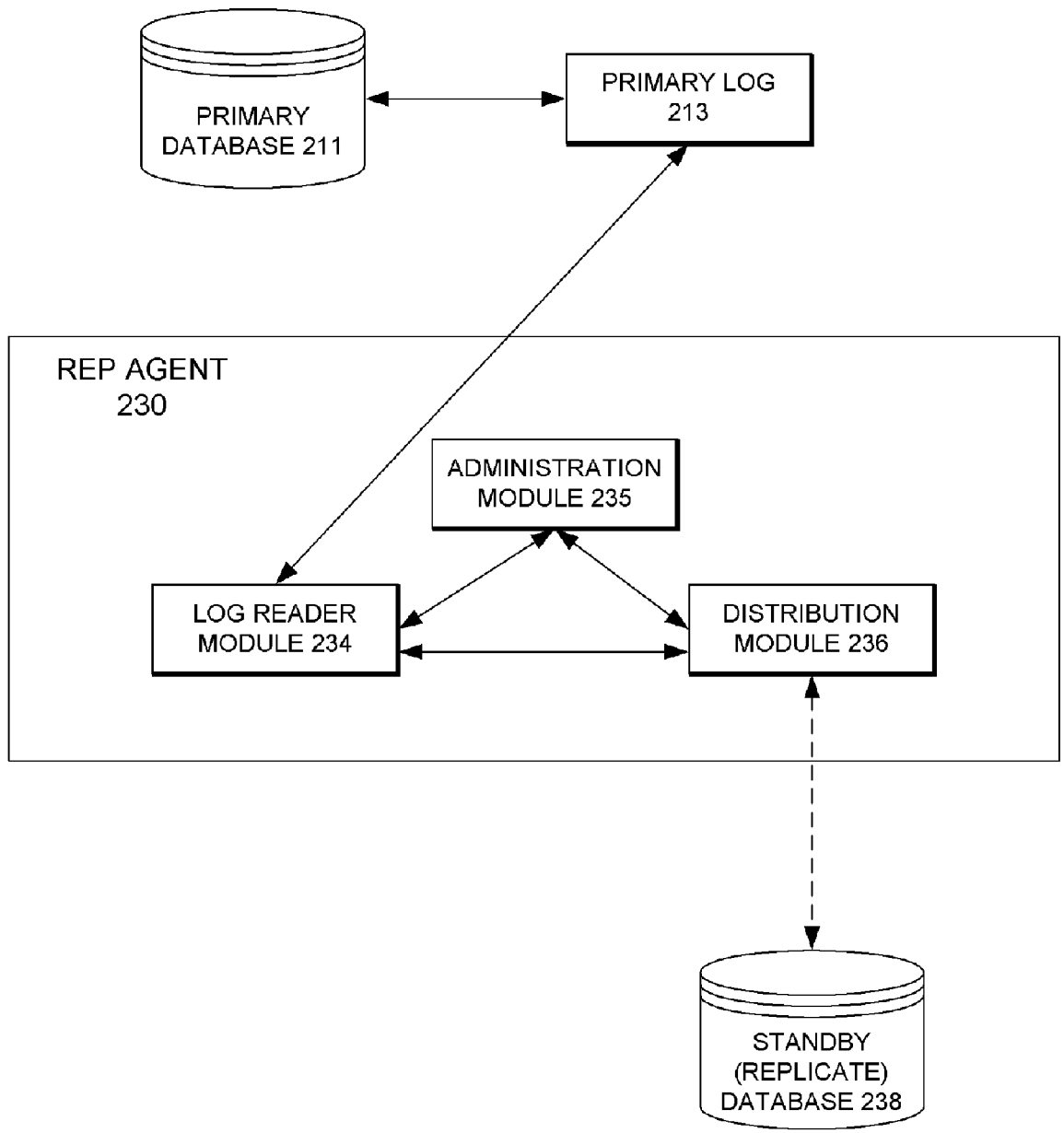
FIG. 2 is a high-level block diagram of an exemplary environment in which a database system is supported by a replication system of the present invention.

FIG. 2 is a high-level block diagram of an exemplary environment 200 in which a database system is supported by a replication system of the present invention. Environment 200 includes at least one server supporting a primary database 211 and a standby or replicate database 238. The primary database 211 may be located at the same machine and/or site as the replicate database 238 or may be located at a different machine and/or location. As shown, the primary database 211 is logically connected to the replicate database 238 via a replication agent ("RepAgent" 230), which comprises the replication system of the present invention. The operation of each of these components will now be described in more detail.

The primary database 211 is the database containing the data that is replicated to the standby or replicate database 238 through the use of the replication methodology of the present invention, as embodied in the replication agent 230. The primary database 211 is also known as the "source" database as it is the source of the data being replicated (i.e., where data is being replicated from). As the present invention provides procedure replication support (e.g., for stored procedures and functions) to database systems lacking facilities for logging stored procedure invocations (e.g., Oracle), the primary database is typically implemented using such a database system (e.g., Oracle 12.6). However, the primary database may alternatively be implemented as another type of database or file system, particularly in instances where such replication support is required.

The primary database 211 is typically used to support the operations of a user application or system (not shown). For instance, the primary database 211 may be employed to support an on-line transaction processing (OLTP) application, such as a sales and order processing application. As the application operates, the posting of data from "transactions" are posted to one or more database tables of the primary database 211. As part of this process, the primary database 211 employs a logging system to log changes which occur to the system to a primary (transaction) log 213.

In a commercial embodiment such as Oracle or Sybase Adaptive Server Enterprise, this is done by copying log records to the database's transaction (primary) log 213. (For further information on logging operations in a database system, see e.g., U.S. Pat. No. 6,321,234 titled "Database server system with improved methods for logging transactions"). Every transactional operation, including inserts, updates, and deletes to the database, causes a log record to be written to the transaction (primary) log 213, which is commonly referred to simply as the "log." Each particular log record characterizes the change which has occurred to the primary database 211 during processing of a transaction. These log records can be used, for instance, in error recovery, to restore the database 211 to a preexisting, consistent state. Of particular interest to the present invention, these log records are also used for replication of transactions, including procedure invocations posted to the primary database 211, to the secondary or replicate database 238 as hereinafter described.

The replication agent 230 includes a log reader module 234, administration (LogAdmin) module 235, and distribution (or distributor) module 236, which operate to maintain a replicate database 238 from the log records. SQL transactions are read from the primary log 213 (or reconstructed from replicated log records, not shown) and are applied to the replicate database 238. The log reader module 234, administration module 235, and distribution module 236 of the present invention will now be described in more detail.

The log reader module 234 is responsible for reading log records from a database log (i.e., primary or mirror log records). It is also responsible for log management in the case of multiple log files (both online and archived). The log reader module 234, which includes interfaces to the administration module 235 and distribution module 236, has access to primary database schema metadata in order to fully read and understand a log record from the primary log. In operation, the log reader module reads the log records and uses the schema information, which is managed by the administration module 235, to build a complete transaction operation. It then queues the operation for delivery by the distribution module 236 to the replicate database 238.

The distribution module 236, which interfaces with the log reader module 234 and the replicate database 238, is responsible for formatting and sending log records to a destination (e.g., replicate database 238) in a manner that is consistent with how original transaction(s) were executed at the primary database 211. The distributor 236 reads a transaction (which may contain one or more operations) from a queue populated by the log reader module 234. The distributor then formats the transaction operation(s) (e.g., into a Structured Query Language (SQL) statement) and executes the transaction operation(s) at the replicate database 238 (e.g., via a JDBC database connection). The distribution module 236 is also responsible for keeping track of the last committed transaction in order to avoid missing or duplicating any transactions.

The administration module 235, which has interfaces with the primary database 211 and the log reader module 234, is responsible for integrating and managing the operation of the other system components. This includes system property and state management as well as command routing services. The administration module 235 also provides an interface that all components can use for storage of system metadata, such as the primary database schema information. In addition, the module is responsible for system initialization on startup. This includes all setup required on initial startup, as well as error checking on subsequent startups of the replication system. On initial startup, the administration module captures schema from the primary database and keeps it in an internal format for access by the log reader. The operations of the replication system of the present invention supporting replication of procedure invocations occurring at a primary database system will now be described.

Existing Replication System Infrastructure

A. General

For purposes of economy and efficiency, the present invention is implemented by modifying an existing replication system (e.g., Sybase Replication Agent 12.5). In order to understand the modifications for implementing the present invention, it is helpful first to review the existing infrastructure for capturing stored procedure information. In this manner, the reader can better understand the changes required for implementing the system and methodology of the present invention.

In the existing replication system, a shadow table(s) (ST) and a shadow row procedure (SRP) are uniquely generated for each primary procedure or primary table that the user marks. Thus, a given primary procedure has its own shadow table (ST) and its own shadow row procedure (SRP), and a given primary table has its own shadow table (ST), blob shadow table (BST), and shadow row procedure (SRP), in addition to the insert, update, and delete triggers that are placed on the table to know when the table is modified. The reason for the unique shadow table(s) (ST) and shadow row procedure (SRP) is to handle each primary object's unique data (columns or parameters). Also, a shadow row procedure (SRP) for a primary table differs from a shadow row procedure (SRP) for a primary procedure. However, the steps that a given shadow row procedure (SRP) takes are the same for all primary tables or for all primary procedures.

B. Capturing the Procedure Call

In basic operation, the existing replication system instruments the user's procedure (the "primary procedure"), capturing the values of the parameters in a shadow table (ST) and capturing the duration of the procedure by inserting, then deleting, an entry in the proc-active table. The primary procedure is instrumented to call the shadow row procedure (SRP) both "on entry" and "on exit." One shadow row procedure (SRP) exists per marked primary table or marked primary procedure; it contains the logic for capturing the operation's primary data and metadata.

1. "On Entry" into and "On Exit" from the Primary Procedure

Figure 3:
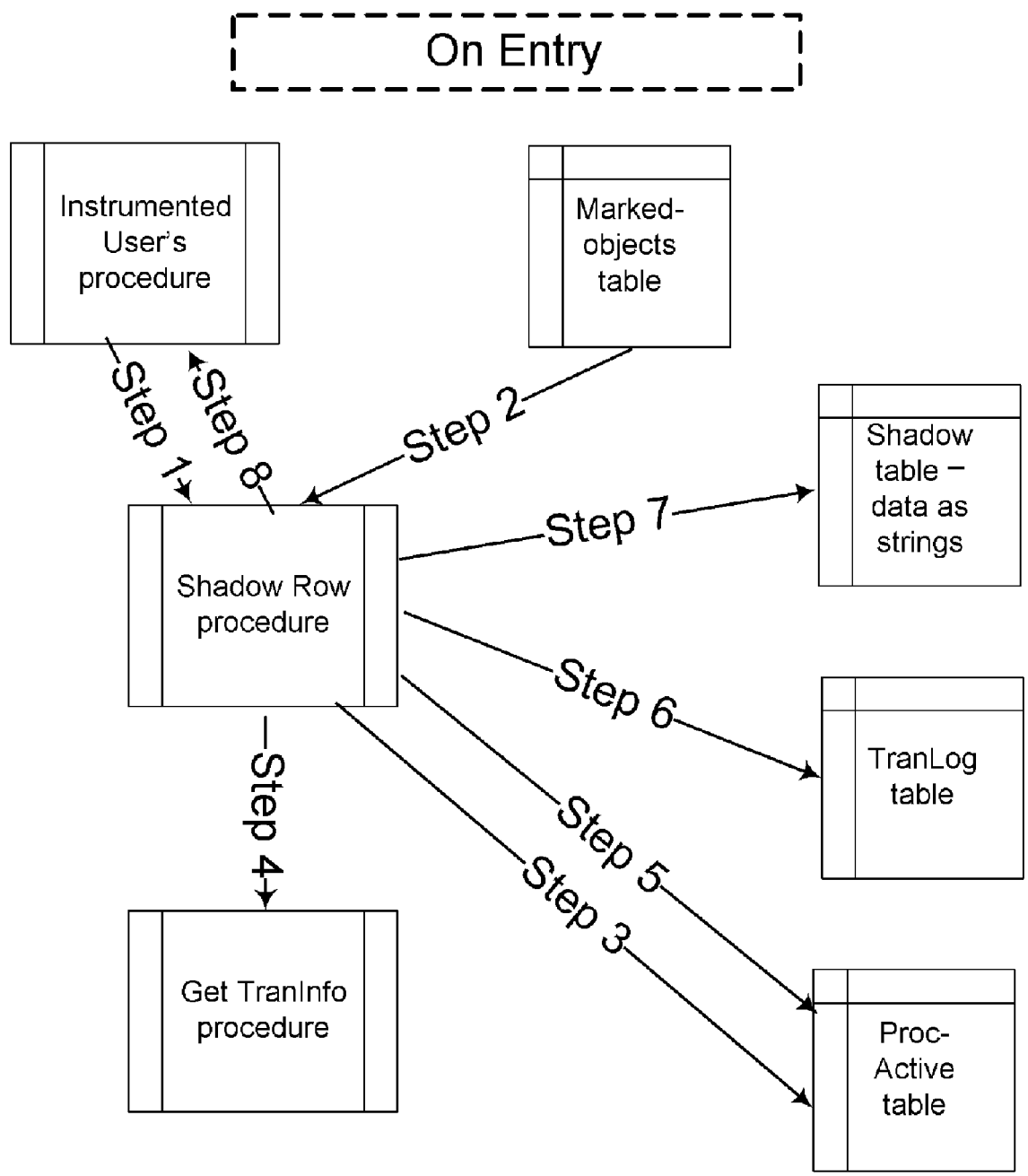
FIG. 3 is a block diagram illustrating the instrumentation steps that occur on entry into the primary procedure, for an existing replication system.

FIG. 3 is a block diagram illustrating existing steps that occur on entry into the primary procedure.

Step 1

The entry instrumentation of the primary procedure calls the shadow row procedure (SRP) with a 0 value for the tran-id (transaction identifier) and a flag indicating the start of the stored procedure.

Step 2

The shadow row procedure (SRP) queries the marked object table to verify that the primary procedure is marked and to determine whether or not replication is enabled. If the primary procedure is not marked or if replication is disabled, then the shadow row procedure (SRP) does nothing but returns.

Step 3

If the primary procedure is marked and replication is enabled, the shadow row procedure (SRP) updates the initial row in the proc-active table.

Step 4

The shadow row procedure (SRP) obtains the next sequential value to use for this operation's id and calls a get-tran-info procedure to obtain the current transaction ID.

Step 5

The shadow row procedure (SRP) inserts a row into the proc-active table indicating that the primary procedure has begun. The row contains the transaction ID and the owner-qualified name of the primary procedure.

Step 6

The shadow row procedure (SRP) inserts a row into the tran-log table. The row contains the tran-id, the op-id, the shadow table name, null for the blob-shadow table name, a timestamp, 0 for the process-sequence value, the owner of the primary procedure, and the primary procedure name.

Step 7

The shadow row procedure (SRP) inserts a row into the shadow table. The row contains the tran-id, the op-id, the image type indicating that this is a procedure call (as opposed to an insert image, a before image, or an after image), and, if the procedure has parameters, the string values of each of the parameter values (a separate column for each parameter).

Step 8

The shadow row procedure (SRP) returns the tran-id to the primary procedure.

Step 9

The primary procedure executes (i.e., "does its thing").

Figure 4:
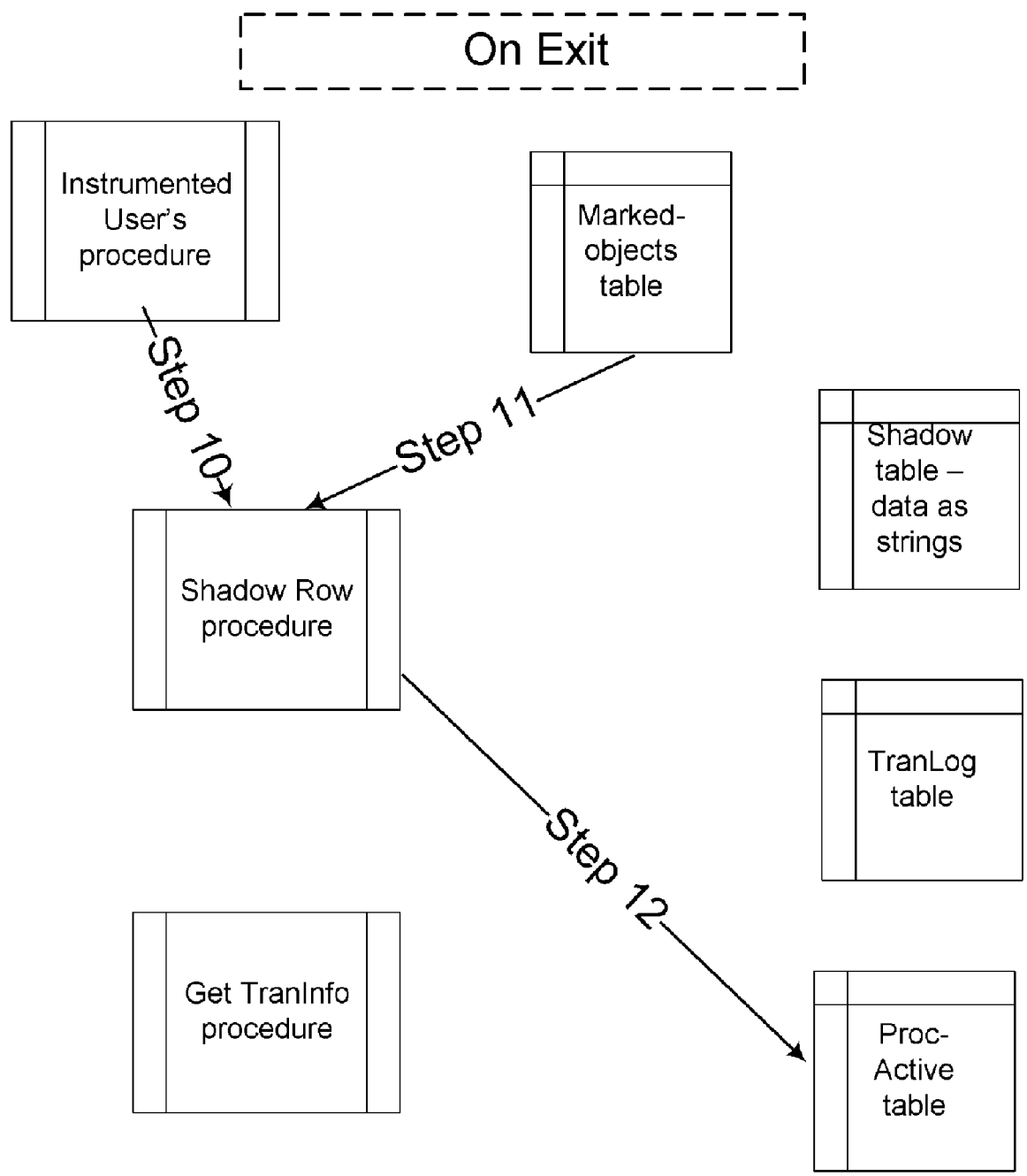
FIG. 4 is a block diagram illustrating the instrumentation steps that occur on exit from the primary procedure, for the existing replication system shown in FIG. 3.

FIG. 4 is a block diagram illustrating the subsequent steps that occur on exit from the primary procedure.

Step 10

The exit instrumentation of the primary procedure calls the shadow row procedure (SRP) with the tran-id (that was returned by the entry instrumentation) and a flag indicating the end of the stored procedure.

Step 11 (same as Step 2)

The shadow row procedure (SRP) queries the marked object table to verify that the primary procedure is marked and to determine whether or not replication is enabled. If the primary procedure is not marked or if replication is disabled, then the shadow row procedure (SRP) does nothing but returns.

Step 12

The shadow row procedure (SRP) deletes the row it previously inserted from the proc-active table, using the tran-id and the owner-qualified procedure name as the selection criteria.

Modified Replication System

The following discussion focuses on changes required for implementing the system and methodology of the present invention.

A. Initialization: pdb_init

1. Odometer

A system odometer is employed for name generation. The odometer, which is maintained in a database repository, is reset using the LogAdmin module. The odometer is updated whenever a new shadow table is created. Given a root name, the concatenated odometer value provides a unique name. The characters used (in order) are the lowercase letters, the underscore, and the digits. Within each group, the system starts with the lowest value and goes up. For example, a b . . . y z _ 0 1 . . . 8 9

Working left to right, once all the characters are exhausted (i.e., the 9 has been used) within the right-most position of the odometer, the length of the odometer is increased by one character. Sample odometer readings include:

a

9x

999_

999m

999999

2. Procedure-Calling Sequence and Proc-Active Table Schema

In order to support the possibility of a "recursive" call, either directly or in the call stack, of a procedure or function, each procedure/function call must be uniquely identified. A sequence number or identity is used for this purpose. The system maintains a sequence counter, so that each procedure or function call may be assigned a unique sequence number. The following SQL script demonstrates initialization of a proc-active table (QA3PROCACTIVE_) and creation of an accompanying sequence counter (QA3PCALL_).

```
 1: --
 2: -- SEQUENCE COUNTER FOR PROC/FUNC CALL
 3: --
 4: CREATE SEQUENCE QA3PCALL_
 5:   CACHE 100 INCREMENT BY 1 START WITH 1 ORDER;
 6:
 7: GRANT SELECT ON QA3PCALL_ TO PUBLIC;
 8:
 9: CREATE PUBLIC SYNONYM QA3PCALL_ FOR QA3PCALL_;
10:
11: --
12: -- PROC ACTIVE TABLE
13: --
14: CREATE TABLE QA3PROCACTIVE_(
15:   RA_CALLSEQ_  NUMBER,
16:   RA_SID_      NUMBER,
17:   RA_OWNER_    VARCHAR2(256),
18:   RA_SPROC_    VARCHAR2(256),
19:   RA_SPID_     NUMBER,
20:   RA_SHADOW_   VARCHAR2(256),
21:   RA_SHID_     NUMBER,
22:   RA_OBJTYPE_  NUMBER
23: );
24:
25: GRANT ALL ON QA3PROCACTIVE_ TO PUBLIC;
26:
```

-continued

```
27: CREATE PUBLIC SYNONYM QA3PROCACTIVE_ FOR
    QA3PROCACTIVE_;
28:
29: COMMIT;
```

(An Oracle sequence is the functional equivalent of a Sybase ASE identity.) During start-proc instrumentation, the system obtains the sequence number for the procedure and inserts it into both the shadow and proc-active tables. This sequence column will then be used in both tables as the primary key when doing the deletes in the end-proc instrumentation.

The LogAdmin module creates an empty (no rows) proc-active table and its public synonym with grants to public, and stores these names in the database repository. To be able to create a table and its synonym in the database requires that the database user (pds_username) has the CREATE TABLE and the CREATE SYNONYM system privileges. The schema for the table is shown above (lines 14-23).

The row provides all the info that the data source log reader (DSLR) needs to easily obtain the shadow table article from the repository and recognize that it is really the procedure in disguise. In the currently preferred embodiment, the proc-active table naming is downward compatible (to Sybase Replication Agent 12.5), using the configured prefix and an initial odometer setting of the empty string, with the resulting odometer value not being saved.

B. DDL Replication

If the user has DDL (database definition language) replication enabled and the user's primary procedure is replaced with an instrumented version, then the re-created DDL will be replicated. This can potentially cause problems at the replicate by incorrectly modifying the replicate procedure for the environment at the replicate site. Therefore, to address the issue, DDL replication should be disabled at the time a procedure is either marked or unmarked. Preferably, the user should undertake the disabling and enabling of DDL replication because only he or she knows when it is safe to do so. If the replication system were to silently to do it, other DDLs may get lost.

C. Marking: pdb_setrepproc Mark

1. Shadow Table Schema and Naming

The LogAdmin module creates the procedure's (empty) shadow table and its public synonym with grants to public, and stores these names in the database repository. The schema for this table is as follows:

```
1: create table <prefix>sh_<suffix>(
2:   <0 or more user columns representing sproc params>
3:   RA_CALLSEQ_ number,   -- current session id
4: );
```

Shadow table naming employs the existing (Sybase Replication Agent 12.5) naming convention and uses the odometer to generate a suffix resulting in a unique table name. The used value of the odometer is saved in the database repository so that the next shadow table name can use the next value.

For a procedure that has no parameters, the system supplies a default column of its own. As a sanity check (i.e., error checking purposes), the system always includes the same Replication Agent (RA) column. In the currently preferred embodiment, the data columns in the shadow table (ST) have the same names and are of the same data types as the parameters they represent (i.e., the values are not converted to string data types, as was the case with the pre-existing replication system).

As shown in the above schema, an extra column is defined in the stored procedure shadow table definition in addition to the columns matching the stored procedure arguments. Specifically, a numeric "RA_CALLSEQ_" column is added as the last column in the table to ensure transaction integrity during replication. For instance, if a given marked stored procedure is executed at the same time in two different database sessions, the RA_CALLSEQ_ column value ensures that only the row inserted in the shadow table at procedure execution start time is deleted at procedure execution end time.

2. Procedure Entry/Exit Instrumentation

The LogAdmin module instruments the user's primary procedure. This requires replacing the user's original procedure with the instrumented version. Using the OR REPLACE clause when re-creating the original procedure automatically re-grants the privileges previously granted on the original procedure. The owner of the modified procedure should also be the original owner. To be able to re-create a procedure using the original owner requires that the replication user (pds_username) has the ALTER ANY PROCEDURE system privilege.

A sample entry instrumentation is a follows:

```
1: /** BEGIN SYBASE REPLICATION CODE */
2: RA_CSEQ_ NUMBER;
3: RA_SPOBJID_ NUMBER;
4: RA_SHOBJID_ NUMBER;
5: BEGIN
6:   select QA3PCALL_.NEXTVAL into RA_CSEQ_ from DUAL;
7:
8:   select OBJECT_ID into RA_SPOBJID_ from ALL_OBJECTS
9:     where OWNER = 'QA3USER'
10:       and OBJECT_NAME = 'WZB_MYDIVEX'
11:       and OBJECT_TYPE = 'FUNCTION';
12:
13:  select OBJECT_ID into RA_SHOBJID_ from ALL_OBJECTS
14:    where OWNER = 'QA3USER'
15:      and OBJECT_NAME = 'QA3SH_F'
16:      and OBJECT_TYPE = 'TABLE';
17:
18:  INSERT INTO QA3USER.QA3PROCACTIVE_A VALUES(
19:    RA_CSEQ_,
20:    USERENV('SESSIONID'),
21:    'QA3USER',
22:    'WZB_MYDIVEX',
23:    RA_SPOBJID_,
24:    'QA3SH_F',
25:    RA_SHOBJID_,
26:    2 );
27:  INSERT INTO QA3USER.QA3SH_F VALUES(
28:    NUM,
29:    MAX,
30:    RA_CSEQ_ );
31: /**** END SYBASE REPLICATION CODE ***/
```

As shown at line 6, the system gets the previously-mentioned sequence number (i.e., unique identifier for the procedure call). At line 8, the object ID for the procedure (being replicated) is obtained. At line 13, the object ID for the corresponding shadow table (that will be updated) is obtained. At line 18, a row or record is now inserted into the proc-active table with the operational and transactional information for the procedure call (e.g., see sample values shown). Finally, at line 27, a row is inserted into the shadow table for the procedure's argument values. Note that the proc-active and shadow tables are linked (i.e., foreign key) via the procedure's sequence number (RA_CSEQ_).

A sample exit instrumentation for a procedure is as follows:

```
 1: /** BEGIN SYBASE REPLICATION CODE */
 2: END;
 3:    DELETE FROM QA3USER.QA3SH_G where
       RA_CALLSEQ_ = RA_CSEQ_;
 4:    DELETE FROM QA3USER.QA3PROCACTIVE_A where
       RA_CALLSEQ_ = RA_CSEQ_;
 5:
 6: EXCEPTION
 7: WHEN OTHERS THEN
 8:    ROLLBACK;
 9:    DELETE FROM QA3USER.QA3SH_G where
       RA_CALLSEQ_ = RA_CSEQ_;
10:    DELETE FROM QA3USER.QA3PROCACTIVE_A
       where RA_CALLSEQ_ = RA_CSEQ_;
11:    COMMIT;
12:    RAISE;
13: /**** END SYBASE REPLICATION CODE ***/
```

At lines 3-4, the exit instrumentation performs clean-up by deleting the above-mentioned proc-active and shadow table rows. As shown, the deletions are done in reverse order from the previously-described insertion. At lines 6-12, the exit instrumentation provides exception handling code. This code accounts for the case that an errors occurs in the original procedure (i.e., the user's stored procedure code). If an error occurs and the procedure itself is not able to execute successfully, replication will not be performed. In other words, the replication system does not replicate procedures that do not execute successfully. As shown, in the case of a procedure error, a rollback is performed (line 8), the rows from the shadow and proc-active tables are deleted (lines 9-10), and an exception is raised (line 12).

A sample exit instrumentation for a function (i.e., call returning a value) is as follows:

```
 1: /** BEGIN SYBASE REPLICATION CODE */
 2:    DELETE FROM QA3USER.QA3SH_F where
       RA_CALLSEQ_ = RA_CSEQ_;
 3:    DELETE FROM QA3USER.QA3PROCACTIVE_A where
       RA_CALLSEQ_ = RA_CSEQ_;
 4: /**** END SYBASE REPLICATION CODE ***/
 5:
 6: return ctr; -- sample user's return statement
 7:
 8: /**** BEGIN SYBASE REPLICATION CODE ***/
 9: END;
10:
11: EXCEPTION
12: WHEN OTHERS THEN
13:    ROLLBACK;
14:    DELETE FROM QA3USER.QA3SH_F where
       RA_CALLSEQ_ = RA_CSEQ_;
15:    DELETE FROM QA3USER.QA3PROCACTIVE_A where
       RA_CALLSEQ_ = RA_CSEQ_;
16:    COMMIT;
17:    RAISE;
18: /**** END SYBASE REPLICATION CODE ***/
```

For the exit instrumentation for a function (i.e., procedure or routine returning a value), the SQL code sequence is similar to that just described for a procedure. However, as functions return values, the instrumented function includes a return statement (line 6) between the instrumented code. With function replication, therefore, the instrumentation code is essentially broken up into two blocks or sections of code, with the return statement in between.

3. Shadow Table and Procedure Articles

In the replication system's internal database (Replication Agent System Database or "RASD"), the LogAdmin module marks the procedure. The shadow table article included information so that the data source log reader (DSLR) recognizes that operations to this table, even though the table itself is not marked, represent the user's procedure calls (as opposed to marker calls, such as rs_marker and rs_dump).

Separate articles for the procedure and the shadow table may be required, but they should reference each other so that, if one is retrieved, the other can easily be retrieved. In addition, it might be convenient for the data source log reader (DSLR) to have the shadow table article hold or, via pass-through methods, be able to retrieve the procedure marking/replication status and the replicated procedure name. Thus from the data source log reader (DSLR) perspective, it would only need to retrieve the shadow table article.

D. Capturing the Procedure Call

Figure 5:
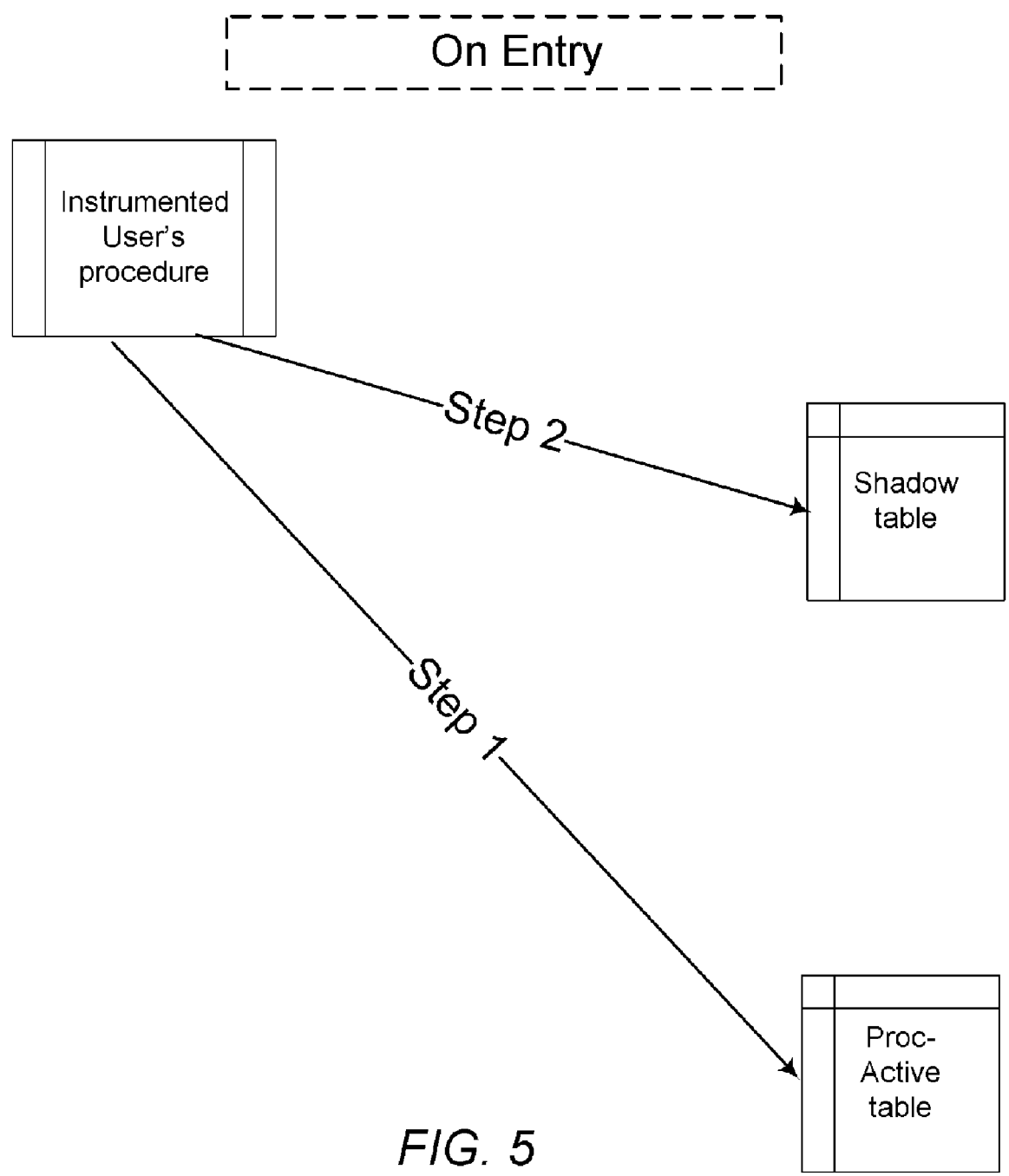
FIG. 5 is a block diagram illustrating the new instrumentation steps that occur on entry into the primary procedure, for an improved replication system of the present invention.
Figure 6:
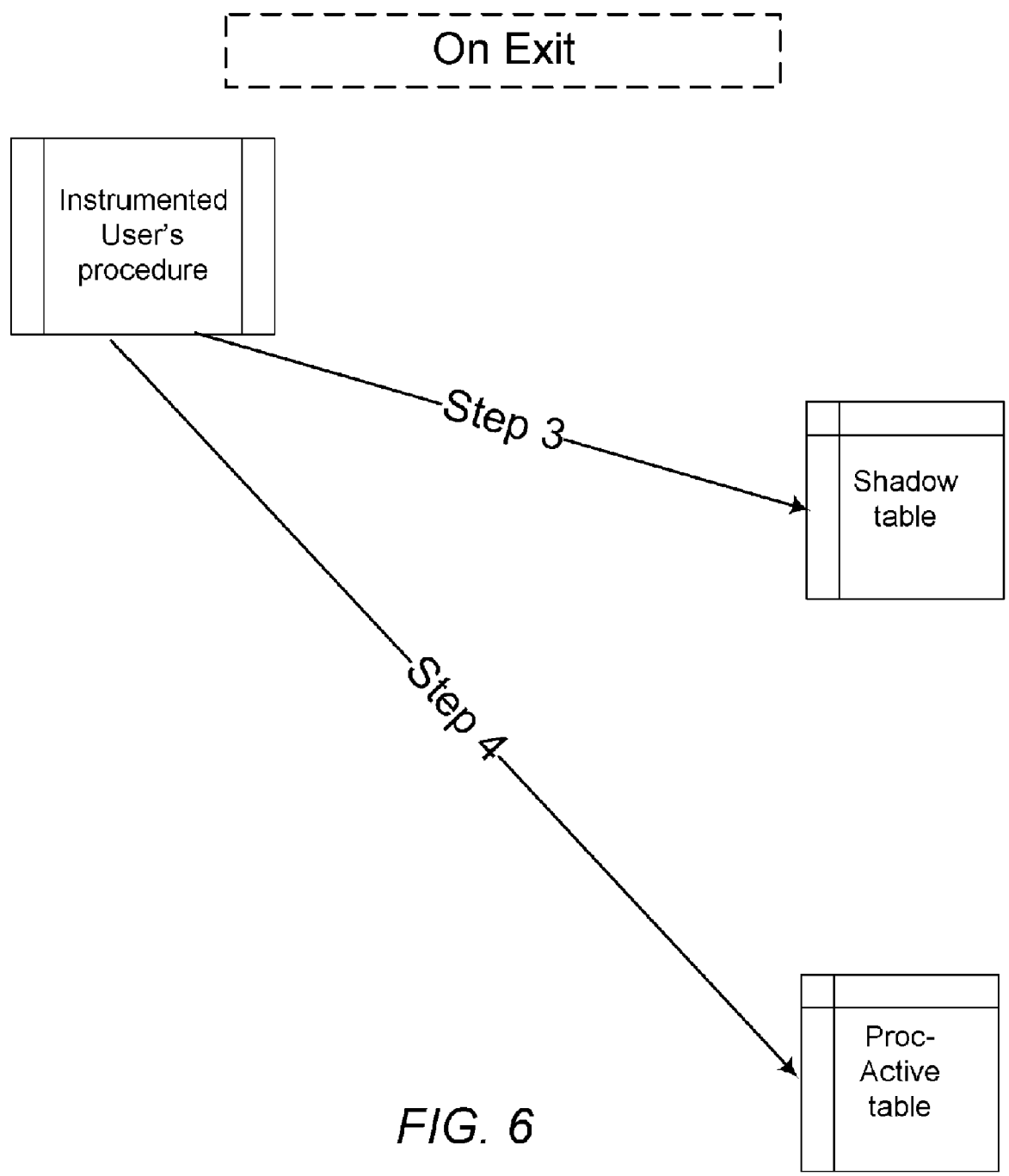
FIG. 6 is a block diagram illustrating the new instrumentation steps that occur on exit from the primary procedure, for the improved replication system shown in FIG. 5.

In accordance with the present invention, transaction information is no longer captured; instead, the logging system of the underlying database system (e.g., Oracle) is used to do so. FIGS. 5 and 6 are block diagrams illustrating steps of the present invention for capturing the procedure call using this modified approach.

Step 1

The entry instrumentation of the primary procedure obtains the next procedure-call sequence number (discussed below), the current session id, and the object ids for the shadow table and the procedure, then inserts a row into the proc-active table.

Step 2

The entry instrumentation of the primary procedure inserts a row into the shadow table that includes the procedure-call sequence number and the values of all parameters, if any.

Step 3

The exit instrumentation deletes the row from the shadow table using the held procedure-call sequence number. By always deleting the data row which is not needed after the procedure exits, one avoids having to truncate the table.

Step 4

The exit instrumentation deletes the row from the proc-active table using the held procedure-call sequence number. By always deleting the metadata row which is not needed after the procedure exits, one avoids having to truncate the table.

E. Unmarking: pdb_setrepproc Unmark

In the Replication Agent System Database (RASD), the LogAdmin module unmarks the primary procedure. The LogAdmin module then removes the instrumentation from the user's procedure. This entails replacing the instrumented version of the procedure with the "un-instrumented" version at the primary database. As with marking, the owner of the replacement procedure should also be the original owner. The LogAdmin module drops the shadow table and its public synonym from the database.

F. pdb_xlog Remove OR ra_deinit

Just as the replication system is initialized, the system may be de-initialized. De-initialization is distinguished from shut down. With shut down, replication (temporarily) ceases. With de-initialization, replication as a feature is essentially removed from the primary database, including removing supporting tables. Specifically, the LogAdmin module drops the proc-active table, its public synonym, the procedure-calling sequence, and its public synonym, as well as the rs_marker and rs_dump procedures and their shadow tables and public synonyms, and deletes all the related entries from the Replication Agent System Database (RASD). The foregoing returns the database to its original state (i.e., prior to setting up replication support for procedures).

Source Code Implementation and Internal Operation

The following description presents method steps that may be implemented using processor-executable instructions, for directing operation of a device under processor control. The processor-executable instructions may be stored on a computer-readable medium, such as the computer's hard drive, CD, DVD, flash memory, or the like. The processor-executable instructions may also be stored as a set of downloadable processor-executable instructions, for example, for downloading and installation from an Internet location (e.g., Web server).

Following presents Java source code illustrating implementation of the present invention.

```
 1: // If the article represents a system object (i.e. marker, dump,
 2: // proc active table, proc shadow table), then handle appropriately.
 3: if(article.isAgentSystemObject( ))
 4: {
 5:    if(article.isProcActiveTable( ))
 6:    {
 7:       // If this change operation represents an update to the RAO
 8:       // system "proc active" table, then process accordingly.
 9:       try { returnOp = processProcActive(chgOp); }
10:       catch(TransactionException ex) { throw ex; }
11:    }
12:    else if(_sessionContext.isProcedureActive( ) &&
13:           _sessionContext.getActiveProcedure( ).isEnabled( ))
14:    {
15:       // If a procedure is currently active and enabled for replication,
16:       // all change operations should be filtered, but we must check
17:       // for and capture the procedure shadow table change operation
18:       // in order to set the procedure parameters.
19:
20:       // Get the active procedure context.
21:       OracleProcedureContext pctxt =
              _sessionContext.getActiveProcedure( );
22:
23:       // Get the active procedure shadow table id.
24:       int shadowid = pctxt.getShadowTableObjectID( );
25:
26:       // If the change operation is an insert operation and the
27:       // procedure shadow table id matches the object id that the
28:       // change operation affects, the change operation contains the
29:       // procedure parameters.
30:       if(shadowid == chgOp.getObjectID( ) && chgOp.isInsert( ))
31:       {
32:          pctxt.setParamaters(
33:             new ProcedureChangeData(pctxt.getArticle( ),
34:                    chgOp.getAfterImage( )));
35:       }
36:
37:       // Skip this operation because it is the result of marked
38:       // procedure execution.
39:       if(Log.DEBUG && TXCTXDBG.getLogging( ))
40:          DBG_LOGGER.finest(TXSKIPOP + chgOp);
41:
42:       // Set the return operation to null so that the operation is
43:       // filtered.
44:       returnOp = null;
45:    }
```

```
46:    else
47:    {
48:       // Skip this operation because it applies to a system object.
49:       if(Log.DEBUG && TXCTXDBG.getLogging( ))
50:          DBG_LOGGER.finest(TXSKIPOP + chgOp);
51:
52:       returnOp = null;
53:    }
54: } // end isAgentSystemObject
55: else if(article.isMarked( ) && article.isEnabled( ))
56: {
57:    // If the article is marked, and a procedure is not currently
58:    // active, return the change operation.
59:    if(_sessionContext.isProcedureActive( ) &&
60:       _sessionContext.getActiveProcedure( ).isEnabled( ))
61:    {
62:       // Skip this operation because it is the result of marked
63:       // procedure execution.
64:       if(Log.DEBUG && TXCTXDBG.getLogging( ))
65:          DBG_LOGGER.finest(TXSKIPOP + chgOp);
66:
67:       returnOp = null;
68:    }
69:    else
70:    {
71:       // Check to see if any LOBs need to be processed as a
72:       // result of the operation. Either returns this same
73:       // operation, or an operation iterator if processing of
74:       // LOB chunks is required.
75:       returnOp = _lobHelper.processChangeOperation(article, chgOp);
76:    }
77: } // end isMarked( ) && isEnabled( )
78: else
79: {
80:    // Skip this operation because the article is not marked.
81:    if(Log.DEBUG && TXCTXDBG.getLogging( ))
82:       DBG_LOGGER.finest(TXSKIPUNMRK + chgOp);
83:
84:    returnOp = null;
85: }
```

Operation is as follows. Line 3 checks whether the database object affected by the change operation is a Replication Agent system object. Line 5 checks whether the database object is the proc-active table and, if so, calls the processProcActive function. If the database object is not the proc-active table, then the logic checks for an active, enabled procedure on Line 12. If there is an active, enabled procedure in the current session, then the context for the active procedure is referenced on Line 21. Line 30 checks whether the current operation is an insert operation and also whether the object id for the current operation matches the object id for the procedure shadow table associated with the marked procedure. If it is, then the operation change data contains the argument values specified on procedure execution, so those values are stored in the active procedure context on Line 32. Regardless, the change operation is skipped since it is the result of procedure execution. Line 59 also checks to see if a change operation to a database object that is not a Replication Agent system object was the result of procedure execution.

Following illustrates processing of a proc-active table change operation.

```
107: /**
108:  * Process a proc active table change operation.
109:  * <p>
110:  * The proc active table indicates the beginning and end of procedure
111:  * execution.
112:  *
113:  * @param chgOp the change operation to the proc active table.
114:  *
115:  * @return a procedure execution context for a proc active delete change
```

-continued

```
116: * operation, or null for a proc active insert change operation. In the case
117: * that the procedure execution context also represents the first "replicable"
118: * operation in the transaction, the begin operation will be returned along
119: * with the procedure context in an OperationIterator.
120: *
121: * @throws TransactionException if the article representing the procedure
122: * that was executed was not found or if an error occurs during the lookup
123: * for the procedure in the repository.
124: */
125: private IOperation processProcActive(ChangeOperation chgOp)
126:     throws TransactionException
127: {
128:    IOperation returnOp = null;
129:
130:    if(chgOp.isInsert( ))
131:    {
132:       // Create a begin procedure operation out of the change operation.
133:       ProcActiveBegin beginProc = new ProcActiveBegin(chgOp);
134:
135:       // Create a new procedure context.
136:       OracleProcedureContext pctxt = new OracleProcedureContext(beginProc);
137:
138:       // Get the object id for the procedure executed.
139:       int procid = pctxt.getProcedureObjectID( );
140:       OracleArticle proc = null;
141:       try
142:       {
143:          // Get the article that represents the procedure.
144:          proc = (OracleArticle)_operationProcessor.
145:             getDatabaseContext( ).getArticle(procid, chgOp.getLocator( ));
146:
147:          // Set the article in the procedure context.
148:          pctxt.setArticle(proc);
149:       }
150:       catch(ArticleNotFoundException ex)
151:       {
152:          if(Log.DEBUG && TXCTXDBG.getLogging( ))
153:          {
154:             DBG_LOGGER.log(TXCTXDBG.getLevel( ),
155:                "No article found for procedure with id <" + procid + ">.",ex);
156:          }
157:
158:          throw new TransactionException(ex);
159:       }
160:       catch(Exception ex)
161:       {
162:          if(Log.DEBUG && TXCTXDBG.getLogging( ))
163:          {
164:             DBG_LOGGER.log(TXCTXDBG.getLevel( ),
165:                "Unable to obtain article for procedure with id <" +
166:                procid + ">.", ex);
167:          }
168:
169:          Object[ ] args = { chgOp, new Integer(procid) };
170:          throw new TransactionException("TXCTX_ARTNOGET", args, ex);
171:       }
172:
173:       // Add the procedure to the session context.
174:       _sessionContext.addActiveProcedure(pctxt);
175:
176:       // Update the session context in the session cache.
177:       Integer sessionID = new Integer(_sessionContext.getID( ));
178:       if(_sessionCache.containsKey(sessionID))
179:       {
180:          if(Log.DEBUG && TXCTXDBG.getLogging( ))
181:          {
182:             LOGGER.info("Replacing cached session with id <0x" +
183:                HexConvert.toHex(sessionID) + ">, " +
184:                "user <" + _sessionContext.getUsername( ) + "> " +
185:                "because a new procedure <" +
186:                pctxt.getArticle( ).getName( ).getOwnerQualifiedName( ) + "> " +
187:                "is active.");
188:          }
189:
190:          _sessionCache.put(sessionID, _sessionContext);
191:       }
192:       else
193:       {
194:          if(Log.DEBUG && TXCTXDBG.getLogging( ))
```

-continued

```
195:            LOGGER.info("Session cache: " + _sessionCache.toString( ));
196:
197:          throw new IllegalStateException(
198:            "Session cache does not contain a session entry for session id <" +
199:            sessionID + ">.");
200:        }
201:
202:        if(pctxt.isEnabled( ))
203:        {
204:          if(Log.DEBUG && TXCTXDBG.getLogging( ))
205:            DBG_LOGGER.finest(TXSENDOP + pctxt);
206:
207:          returnOp = pctxt;
208:        }
209:        else
210:        {
211:          // Skip this operation because the procedure is not enabled.
212:          if(Log.DEBUG && TXCTXDBG.getLogging( ))
213:            DBG_LOGGER.finest(TXSKIPUNMRK + beginProc);
214:
215:          returnOp = null;
216:        }
217:      }
218:      else if(chgOp.isDelete( ))
219:      {
220:        // Create an end procedure operation out of the change operation.
221:        ProcActiveEnd endProc = new ProcActiveEnd(chgOp);
222:
223:        // Get the active procedure context.
224:        OracleProcedureContext pctxt = _sessionContext.getActiveProcedure( );
225:
226:        if(pctxt.isEnabled( ))
227:        {
228:          // Add the end procedure operation to the active procedure context.
229:          pctxt.addProcedureEnd(endProc);
230:
231:          // Set the return operation to the procedure context. If this is
232:          // the first "replicable" operation in the transaction, then
233:          // send the begin operation along with the procedure context
234:          // operation. The begin operation is not sent until this point
235:          // in order to filter out any transactions that don't contain
236:          // replicable operations and avoid sending empty begin-commit
237:          // pairs to RepServer.
238:          if(_replicableOpCount == 0)
239:          {
240:            // Return the begin operation AND the procedure context
241:            // operation. In order to keep the begin operation from
242:            // being discarded (in RepServer), set the begin
243:            // operation locator to the same base value as the
244:            // procedure context operation and then increment the
245:            // locator unique field in the procedure context
246:            // operation.
247:            OracleLocator beginLoc = new OracleLocator(pctxt.getLocator( ));
248:            _begin.setLocator(beginLoc);
249:            ((OracleLocator)pctxt.getLocator( )).incrementUniqueField( );
250:            returnOp = new OracleProcedureContextOpIterator(_begin, pctxt);
251:          }
252:          else
253:          {
254:            // Return the procedure context.
255:            returnOp = pctxt;
256:          }
257:
258:          if(Log.DEBUG && TXCTXDBG.getLogging( ))
259:            DBG_LOGGER.finest(TXSENDOP + pctxt);
260:
261:          // Increment the replicable operation count.
262:          _replicableOpCount++;
263:        }
264:        else
265:        {
266:          // Skip this operation because the procedure is not enabled.
267:          if(Log.DEBUG && TXCTXDBG.getLogging( ))
268:            DBG_LOGGER.finest(TXSKIPUNMRK + endProc);
269:
270:          // If the active procedure context represents a disabled
271:          // procedure, set the return operation to null.
272:          returnOp = null;
273:        }
274:
```

```
275:     // Clear the active procedure in the session context.
276:     __sessionContext.clearActiveProcedure( );
277:
278:     // Update the session context in the session cache.
279:     Integer sessionID = new Integer(__sessionContext.getID( ));
280:     if(__sessionCache.containsKey(sessionID))
281:     {
282:       if(Log.DEBUG && TXCTXDBG.getLogging( ))
283:       {
284:         LOGGER.info("Replacing cached session with id <0x" +
285:             HexConvert.toHex(sessionID) + ">, " +
286:             "user <" + __sessionContext.getUsername( ) + "> " +
287:             "because active procedure <" +
288:             pctxt.getArticle( ).getName( ).getOwnerQualifiedName( ) +
289:             "> was cleared.");
290:       }
291:
292:       __sessionCache.put(sessionID, __sessionContext);
293:     }
294:     else
295:     {
296:       if(Log.DEBUG && TXCTXDBG.getLogging( ))
297:         LOGGER.info("Session cache: " + __sessionCache.toString( ));
298:
299:       throw new IllegalStateException(
300:           "Session cache does not contain a session entry for session id <" +
301:           sessionID + ">.");
302:     }
303:   }
304:
305:   return returnOp;
306: }
```

Line 130 checks whether the change operation to the proc active table was an insert operation. An insert operation indicates the beginning of procedure execution. On line 133, a begin proc operation is created based on the proc active change operation. On line 136, a new procedure context is created based on the begin proc operation. The logic on lines 144-149 sets the procedure context with the article object that represents the procedure executed. On line 174, the active procedure context is added to the session context and the session context is subsequently updated in the repository in order to maintain procedure context throughout any Replication Agent state change. Line 218 checks whether the change operation to the proc active table was a delete operation. A delete operation indicates the end of procedure execution. On line 221, an end proc operation is created based on the proc active change operation. On line 224, the active procedure is referenced from the session context. On Line 276, the current active procedure is cleared in the session context and the session context is subsequently updated in the repository in order to maintain procedure context throughout any Replication Agent state change.

```
332: result = processGeneric((LogOperation)op);
333:
334: if(result != null)
335: {
336:   // Check for a procedure exec operation.
337:   IOracleProcedureExecutionOperation procOp = null;
338:   switch(result.getOperationType( ))
339:   {
340:     // If the result represents a procedure exec begin operation,
341:     // save the procedure context to the open tran/proc list.
342:     case IOracleLogOperationType.PROC__BEGIN:
343:       procOp = (IOracleProcedureExecutionOperation)result;
344:       __openTransactions.put(procOp.getProcXID( ), procOp);
345:
346:       // Always filter proc begin operations. The procedure
347:       // execution gets sent when the proc end operation is
348:       // processed.
349:       result = null;
350:       break;
351:
352:     // If the result represents a procedure exec end operation,
353:     // remove the procedure context from the open tran/proc list.
354:     case IOracleLogOperationType.PROC__END :
355:       procOp = (IOracleProcedureExecutionOperation)result;
356:       if(!__openTransactions.containsKey(procOp.getProcXID( )))
357:       {
358:         // Throw an exception if the procedure context wasn't
359:         // in the open tran/proc list
360:         // No entry found in the open tran/proc map with proc
XID.
361:         Object[ ] args = {
362:           procOp.getProcXID( ),
363:           procOp.getProcXID( ).toHexString( )
364:         };
365:         String msg = LocaleManager.getMessage(this,
366:           "OPPROC__NO__PXID__ENTRY__ON__PROCEND",
           args);
367:
368:         if(Log.DEBUG && OPPROCDBG.getLogging( ))
369:         {
370:           DBG__LOGGER.severe(msg);
371:           DBG__LOGGER.info(__openTransactions.toString( ));
372:         }
373:
374:         throw new IllegalStateException(msg);
375:       }
376:       else
377:         __openTransactions.remove(procOp.getProcXID( ));
378:       break;
379:     default:
380:       break;
381:   }
382: }
```

On line 332, the result of processing the log operation is returned. Line 342 checks whether the result was a proc begin operation. If so, the procedure transaction id is stored in the open transactions list and the begin procedure operation is filtered. Line 354 checks whether the result was a proc end operation. If so, the procedure transaction id is removed from the open transactions list.

G. Final Considerations

In order to ensure smooth system operation, the data source log reader (DSLR) recognizes that all operations against the proc-active table are only for DSLR use and should not be replicated (i.e., that the proc-active table is a Replication Agent system object). The insertion of an entry into and the deletion of the same entry from this table bracket the scope of the primary procedure.

When the data source log reader (DSLR) sees an insert operation in the proc-active table, the log record will provide the data source log reader (DSLR) with the following information:

The call sequence number
The session id
The transaction id
The owner and name of the primary procedure/function
The object id of the procedure/function
The name of the shadow table
The object id of the shadow table
Whether the call is made by a user's procedure or function, or by one of the Replication
Agent system procedures (rs_marker or rs_dump)

In addition, the data source log reader (DSLR) needs to determine if the procedure is marked and enabled and, if so, obtain the replicate procedure name and whether or not the LTL-related "send owner" flag is on. With this information, the data source log reader (DSLR) then watches for the insert into the shadow table in this transaction. If the procedure is enabled, then the data source log reader (DSLR) replicates this insert as the procedure call (using the replicate procedure name) and discards all subsequent operations in this transaction until and including the delete from the proc-active table. If the procedure is disabled, then the shadow table insert is ignored and subsequent operations in this transaction are normally processed, with the exception of the delete from the shadow table and the proc-active table (neither of which should be replicated).

Within the shadow table insert record, the data source log reader (DSLR) uses the last column to maintain transactional integrity only and does not replicate it. The remaining data (if any) in the record provide the parameter values (if any). Once the data source log reader (DSLR) encounters the delete from the proc-active table, it can discard the procedure context and continue with normal processing.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a database system employing a log file to record database changes but without support for logging stored procedure invocations, a method for providing support for replicating invocation of a user-created stored procedure from a primary database to a replicate database, the method implemented on at least one computer having a processor and a memory, the method comprising:

receiving from a user Structured Query Language (SQL) statements that define a stored procedure to be invoked at the primary database;

receiving from the user subsequent SQL statements that invoke said stored procedure at the primary database;

inserting into the stored procedure new code that tracks the stored procedure's invocation, wherein when the stored procedure is invoked the new code inserted into the stored procedure also executes, and wherein said new code includes code that inserts table data when the procedure begins executing, code that removes table data when the procedure stops executing, and code that inserts table data indicating with which procedure parameter values the stored procedure is invoked;

responsive to execution of said new code inserted into the stored procedure, recording descriptor information characterizing the stored procedure's invocation, including information about when the stored procedure begins and exits execution, and information about any parameter values passed to the stored procedure, said descriptor information characterizing the stored procedure's invocation without recording information about data values in the primary database that are affected as a result of the stored procedure's invocation;

propagating the stored procedure's invocation through a log file of the primary database, wherein when the stored procedure's invocation is propagated said descriptor information is stored as table data inserted into the primary database;

reading the log file at the replicate database, for interpreting the descriptor information propagated through the log file; and replicating the stored procedure's invocation at the replicate database based on said descriptor information.

2. The method of claim 1, further comprising:

receiving user input for selectively marking stored procedures for replication.

3. The method of claim 1, further comprising:

creating a shadow table storing information about the procedure's parameters, said shadow table including a column for each parameter present in the procedure.

4. The method of claim 3, wherein changes to the shadow table are logged to the log file, so that such changes may be read by a log reader employed for replicating.

5. The method of claim 4, wherein the log reader includes program logic for recognizing log information in the log file corresponding to table data inserted into the shadow table as special purpose information supporting stored procedure replication.

6. The method of claim 3, wherein said shadow table includes a column for transactional integrity.

7. The method of claim 1, further comprising:

creating a table storing information indicating a transactional context for the procedure's invocation.

8. The method of claim 7, wherein said creating step includes storing information indicating any active transactions that are in progress when the procedure is invoked.

9. The method of claim 1, wherein said table data is used to filter out effects of the procedure's invocation from replication, until the procedure has completed execution.

10. The method of claim 1, wherein the primary database itself does not include direct support for logging invocation of stored procedures to the log file.

11. The method of claim 1, wherein said table data includes procedure parameter information stored in a shadow table and includes transactional context information stored in a procedure active table.

12. The method of claim 1, wherein the procedure comprises a database function having a return value.

13. The method of claim 1, further comprising:
downloading a set of processor-executable instructions for performing the method of claim 1.

* * * * *